United States Patent [19]

Nakagawa et al.

[11] 4,023,962

[45] May 17, 1977

[54] PROCESS FOR REGENERATING OR PRODUCING STEEL FROM STEEL SCRAP OR REDUCED IRON

[75] Inventors: Ryuichi Nakagawa, Tokyo; Takuya Ueda, Zushi; Shiro Yoshimatsu, Tokyo; Akira Sato, Omiya; Tatsuro Mitsui, Sagamihara; Tsuyoshi Ozaki, Tokyo; Akira Fukuzawa, Yokohama, all of Japan

[73] Assignee: National Research Institute for Metals, Tokyo, Japan

[22] Filed: Apr. 24, 1975

[21] Appl. No.: 571,224

Related U.S. Application Data

[63] Continuation-in-part of Ser. No. 404,900, Oct. 10, 1973, abandoned.

[30] Foreign Application Priority Data

Oct. 11, 1972  Japan .......................... 47-101126

[52] U.S. Cl. .................................. 75/13; 164/51
[51] Int. Cl.[2] ........................................ C21C 5/52
[58] Field of Search .............. 75/46, 52, 60, 13, 58, 75/12; 164/51

[56] References Cited

FOREIGN PATENTS OR APPLICATIONS 524,662   5/1956   Canada ................................ 75/12
1,141,560 1/1969   United Kingdom .................. 75/13

OTHER PUBLICATIONS

Metals Handbook, Am. Soc. for Metals, 8th Ed. vol. 1, pp. 7 & 25, 1961.

*Primary Examiner*—M. J. Andrews
*Attorney, Agent, or Firm*—Sherman & Shalloway

[57] ABSTRACT

A process for regenerating steel scrap by melting and refining it, the improvement wherein carbon is added to molten scrap steel melt in an amount sufficient to adjust the carbon content of the melt to 0.6 to 3.0%, and the scrap steel is refined by blowing oxygen therein. This method can also be applied to the production of steel from reduced iron.

8 Claims, 1 Drawing Figure

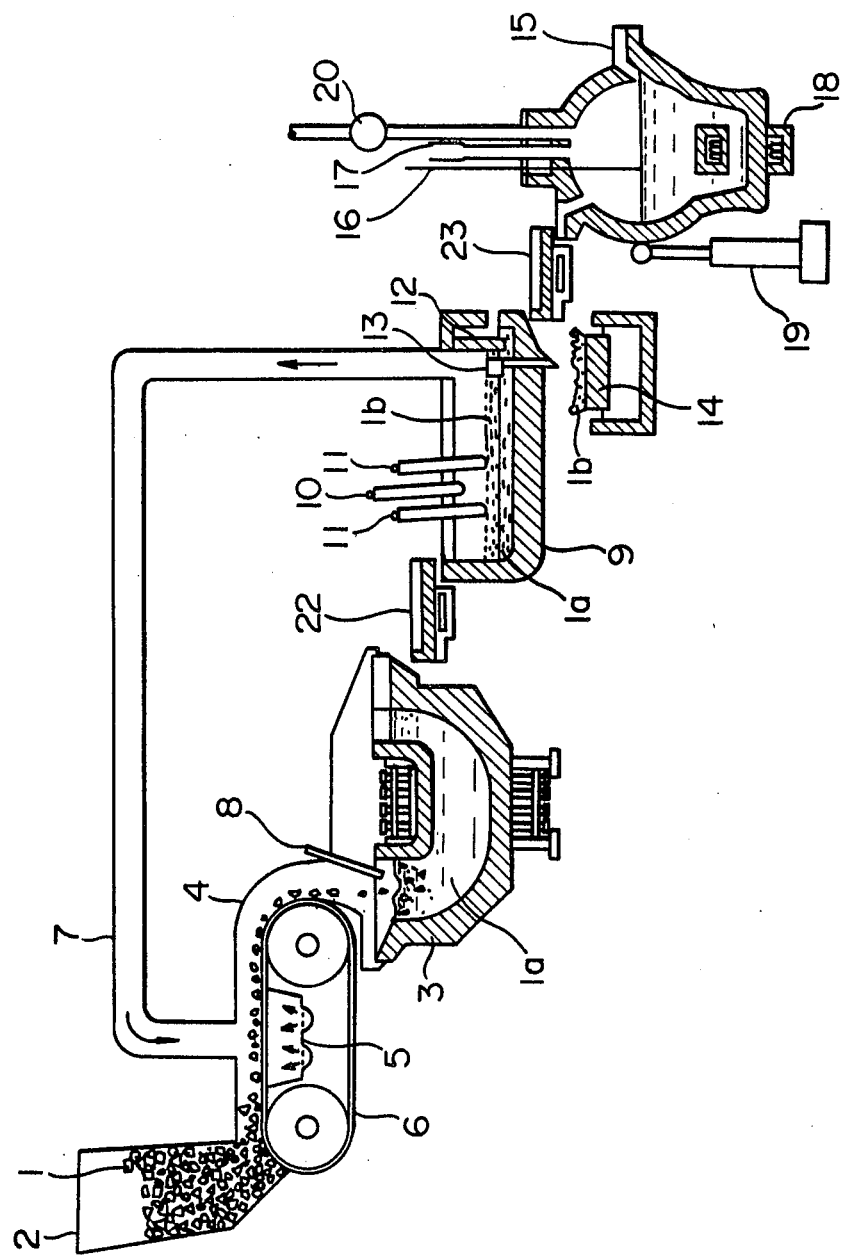

PROCESS FOR REGENERATING OR PRODUCING STEEL FROM STEEL SCRAP OR REDUCED IRON

This application is a continuation-in-part of our copending application Ser. No. 404,900 which was filed Oct. 10, 1973, now abandoned.

This invention relates to a process for regenerating steel from scraps of steel, especially mild steel, and also to a process for producing steel from reduced iron.

Methods for regenerating steel from steel scraps using arc furnaces have previously been known. These conventional methods involve charging steel scraps as a main material and a slag-forming agent such as limestone or fluorspar as subsidiary material into a furnace, melting the materials by generating an arc between a carbon rod electrode and coke spread on the bottom of the furnace, and refining the steel by blowing oxygen thereby to form molten steel. Since in the conventional methods, the refining conditions, especially oxygen blowing condition, are restricted, it is impossible to choose the desired refining conditions according to the quality of the fed starting scrap. Accordingly, the type of scrap steel to be used is restricted. Furthermore, since sufficient refining cannot be performed, regenerated steel of high quality is difficult to obtain.

The conventional methods also involve a principal problem in their extremely inferior melting efficiency. For example, furnaces used generally in these methods are of a batch-wise type so that substantially the whole melting period passes away while the melt is hardly being kept in intimate contact with the steel scraps that have been charged into the furnace together with a carbonizing agent and a slag-forming agent. Further, as the steel scraps have been exposed to a high temperature atmosphere for an extended period of time in the furnace, oxidation of the steel scraps proceeds to such an extent that various problems in turn take place such as lowering of the yield of the carbonizing agent, variation of the carbon content in the melt, fluctuation in temperature of the melt, and so forth. In any of these cases, it is extremely difficult to obtain a melt having a uniform quality.

Accordingly, an object of this invention is to provide a process for regenerating scrap steel in which the desired refining conditions can be selected according to the quality of the starting scrap.

Another object of this invention is to provide a process for regenerating steel scraps which ensures stable refining conditions.

Another object of this invention is to provide a process for regenerating steel scraps which promotes and stabilizes melting of the steel scraps, and improves the yield of the regenerated steel.

Still another object of this invention is to provide a process for producing regeneraged steel of high quality continuously from scraps of mild steel.

A further object of this invention is to provide a process for producing steel of high quality from reduced iron.

The above objects of this invention are achieved by a process for regenerating or producing steel from mild steel scraps or reduced iron, which comprises, in combination, the steps of:

1. charging said steel scrap or reduced iron into a furnace and melting it,
2. adding carbon to the resulting steel melt so that the carbon content of the melt is adjusted to 0.6–3.0%,
3. adding a slag-forming agent to the melt and introducing more than the stoichiometric amount, based on the above amount of carbon, of oxygen to refine the melt, and
4. casting the molten steel so refined, so as to obtain a steel having the composition as follows:
   C : 0.07 – 0.25%
   Si : 0.01 – 0.55%
   Mn : 0.01 – 0.80%
   P : 0.04% or less
   S : 0.04% or less
   Fe : remainder In step (4) of the above process, components such as Si or Mn may, if desired, be added to control the components, or the temperature of the molten steel may be controlled.

The most characteristic aspect of the process of this invention is to add sufficient carbon to adjust the carbon content of the melt to 0.6 to 3.0%. By introducing oxygen in an amount more than the stoichiometrical amount based on amount of carbon, the boiling of the molten matter ascribable to the combustion of carbon is induced, and this makes it possible to effect sufficient refining required to refine steel scrap to high quality steel. At the same time, it is not necessary to supply a heat source from outside because an exothermic reaction occurs between the carbon in the melt and the oxygen introduced, and on the whole, economy of heat is improved. Furthermore, the carbon contained in the melt easily permits dephosphorization and desulfurization, and the regeneration of the scrap to high quality steel can be achieved. The addition of carbon results in the lowering of the melting point of the molten iron and the curtailment of the heat energy required for melting.

Another characterizing feature of the present invention resides in its continuous steps whereby melting is effected while the starting scraps or reduced iron are immersed in the melt formed in the furnace. In this manner, the time required for melting of the starting materials is minimized remarkably to lead to remarkable improvement in the melting efficiency, and further, oxidation of the starting scraps otherwise observed conventionally is now eliminated perfectly.

In the present invention, a wide variety of scrap mild steels can be used. For example, there can be used home scraps such as ingot scrap, roll scrap or cut scrap, automobile scrap, ship scrap, and household scraps such as a washing machine or refrigerator.

The source of carbon to be used in this invention may be propane gas, methane gas, coke powder, and solid carbon powders such as graphite electrode scrap powder.

The amount of carbon to be added is adjusted so that the carbon content in the melt becomes to 0.6 – 3.0%. If it is less than 0.6%, oxygen cannot be blown in a sufficient amount, and therefore, sufficient smelting for the formation of high quality steel cannot be effected. In this case, the melting efficiency in the melting step is also lowered, and quality of the resulting melt becomes non-uniform. If, on the other hand, carbon is added in an amount exceeding 3.0%, a further merit cannot be obtained, and moreover, the amount of oxygen to be consumed in the refining step is increased to no advantage. The preferred amount of carbon is 0.8 to 3.0%, and more preferably, it is 0.8 to 2.0%.

In the refining process of this invention, known slag-forming agents used in the conventional steel-making techniques are used. Typical examples of the slag-forming agent are limestone, fluorspar. bauxite, dolomite and iron ore. The use of a combination of limestone and fluorspar is advantageous.

The typical conposition of steel to be obtained by the process of this invention is as follows:
C : 0.07 to 0.25%
Si : 0.01 to 0.55%
Mn : 0.01 to 0.80%
P : 0.04% or less
S : 0.04% or less
Fe : remainder By adding other elements in the ingredient controlling step which is carried out as required, steel of any desired composition can be produced. The control of the ingredients is well known in the steel-making technique.

Advantageously, all the steps in the process of this invention are carried out continuously, but it is also possible to carry them out batchwise. Alternatively, some of the steps are carried out continuously, and the others batchwise.

In order to perform casting continousouly, it is necessary to feed molten steel at a predetermined temperature in a steady flow to the casting machine. It has been found by the present invention that cracks or segregation in the cast steel material can be prevented by adjusting the temperature of molten steel at the inlet of the casting machine to 20° – 50° C., preferably 20° – 30° C. higher than the solidifying temperature of the molten steel. The method and apparatus for continuous casting are known per se.

In the practice of the process of the present invention, especially in a continuous manner, it is advisable to carry out the melting and carbon-addng steps by the use of one furnace, and also conduct the refining step using another furnace separately. This is because the carbon content as well as the temperature of the melt differ remarkably between the melting/carbon-adding steps and the refining step.

The use of an induction furnace is advantegous as a furnace for carrying out the melting and carbon-adding steps, but other known furnaces may be used. The induction furnace per se used in the melting and carbon-adding steps of this invention is known. The input material is preferably heated prior to charging into a melting furnace.

The smelting step can be carried out using any desired refining furnace of the known type, such as a converter or a continuous steel-making furnace. The use of a continuous refining furnace of the type disclosed in U.S. Pat. No. 3,617,042 is preferred. However, refining can also be performed using the furnace employed in the melting step.

The controlling step which is performed when required may be carried out using a known grading furnace. The control furnace may be a receptacle capable of storing molten steel temporarily, and provided with a heating device and a cooling device.

The casting machine to be used in this casting step is of the known type.

The method of regenerating scrap steel can also be used to produce steel from reduced iron.

The accompanying drawing schematically illustrates one example of the arangement of devices and the sequence of steps when the method of the present invention is carried out continuously.

The invention will further be described by reference to the accompanying drawing 1. Steps of Pre-heating and Charring the Material:-

In this step, a material 1 such as scrap, rduced iron or a mixture of these is fed from a hopper 2, and while being pre-heated, is continuously fed into an electric furnace 3. The step of preheating and feeding the material is not essential, but in order to save heat energy to be supplied in the electric furnace 3, it is preferred to provide a preheating device including a combustion chamber 5 for a liquid or gas fuel and a belt conveyor 6 in the undersurface of a passage 4 between the hopper 2 and the electric furnace 3. It is preferred that one end of a passage 7 for introducing a high temperature exhaust gas from the refining step to be described is opened in the upper portion of the charging passage 4, thereby using the hot gas for preheating the material. Although it is effective to operate both of the combustion furnace and the exhaust gas introducing passage 7 simultaneously, it is of course possible to use only one of them. A carbon feeding tube 8 may be provided on the feeding passage 4. In this case, carbon is fed into the melt at the same place and the same time with the starting iron.

2. Melting step:-

In this step, the fed material is continuously melted while adding carbon to convert it into the molten state. The material is heated to 1300° to 1600° C. in this step, and thus melted. For melting, the electric furnace 3 such as an induction furnace or arc furnace adopted to melt the material 1 by the heat capacity of the molten material 1a and the heat energy supplied by passing electricity is used. A combustion furnace may be used in place of this furnace, but the use of the electric furnace is preferred. The apparatus shown in the drawing is a horizontal-type iron core-free induction furnace. Which type of electric funace is to be used is determined according to the operating conditions. From the viewpoint of the refractory material of the furnace, the use of an acidic material, for example, a siliceous material, is economically advantageous. The induction furnace is most preferred in that it can be of the closed type in order to prevent the discharge of gases and fumes.

In order to promote melting of the steel scraps or reduced iron charged continuously, the molten material 1a must have a higher carbon content than that of the steel scraps or reduced iron. The lower the melting point of the melt 1a is, the more preferable it is for the saving of heat energy of the electric furnace 3 and prolonging of the life of the furnace material. Accordingly, carbon is added at the time of melting the material. The carbon feeding pipe is shown at 8. The carbon supply source may be propane gas, methane gas, coke powder, or solid carbon powder. When carbon is so added to carbon present in the molten iron reacts with oxygen introduced in the subsequent refining step to induce boiling in the molten iron, whereby the impurities in the molten steel are effectively removed to provide high quality steel. Where the material contains phosphorus or sulfur, this carbon addition permits easy dephosphorization or desulfurization in subsequent steps. The amount of carbon to be added should be restricted within a range which does not result in much increase in the amount of oxygen to be consumed in the refining step. Experiment shows that the above effects can be obtained sufficiently by adjusting the amount to 0.6 to 3.0% by weight. When the amount of carbon is within this range, the melting point of the material is about 1350° to 1470° C.

In the furnace shown in the figure, the starting iron and carbon are charged and immersed from the same place into the melt that has been charged in the furnace beforehand and has a carbon concentration of 0.6 – 3.0%, whereupon they are melted in an effective manner. Melting of the starting material is furthered by adequately agitating the melt by means of a magnetic field of the induction coil. Since the starting iron is immersed in the melt, there scarcely occurs the oxidation of the same at the time of melting; hence, deoxidation proceeds effectively. Accordingly, the yield of carbon in the melt is always stable, thereby minimizing fluctuation of the carbon content in the melt discharged.

In the melt staying in the proximity of the feed port where the starting iron charged is present yet in an unmelted state, there may partially be a non-uniformity of the carbon content. However, the carbon content is uniform in the melt at the places other than the above since perfect mixing is effected by means of the magnetic field of the abovementioned induction coil. Accordingly, it is imperative that the discharge port of the melt be differently positioned from the feed port of the starting iron and carbon. For this reason, it is preferable to employ U-shaped or V-shaped furnace in the melting and carbon-adding steps in which the level of the melt is separated between the feed port section and the discharge port section.

3. Refining Step

In this step, melt from the above melting step is received in a refining furnace where various treatments such as desulfurization, dephosphorization, desiliconization, demanganization or decarburation are carried out to convert it to high quality steel or the desired composition. In order to achieve this, a single refining furnace 9 of the type disclosed in U.S. Pat. No. 3,617,042 is used, and a slag-forming agent such as limestone or fluorspar is added to the molten iron via a feed pipe 10. At the same time, oxygen is blown into the melt 1a by oxygen-blowing lances 11. A part of the oxygen may be blown through the slag-forming agent feeding pipe 10. The blowing of oxygen causes boiling of the molten steel to which carbon has been added in the melting step, whereupon the molten steel and the additives such as the slag-forming agent are mixed vigorously, and the steel-making reaction proceeds. Thus, the temperature of the molten iron rises as a result of oxidation reaction, and the amount of each of the ingredients contained in it is reduced. Finally, the slag and molten steel have the desired composition, for example, as shown below are formed.

C : 0.07 – 0.25%
Si : 0.01 to 0.55%
Mn : 0.01 to 0.80%
P : not more than 0.04%
S : not more than 0.04%

Preferably this refining operation is carried out using 5 to 25 Kg of limestone and 1.5 to 7.5 Kg of fluorspar per ton of the molten iron at an oxygen introducing rate of 9.6 to 28.0 $Nm^3$ per ton of the molten iron at a pressure of 2.0 to 5.0 $Kg/cm^2$. The slag 1b formed is collected by a skimmer 12 provided downstream of the passage for molten steel in the refining furnace 9, and withdrawn from the furnace through a slag discharge opening 13. The slag 1b is received by a ladle 14.

On the other hand, exhaust gases such as carbon monoxide, carbon dioxide gas, hydrogen or nitrogen evolved in the refining step are preferably used for preheating of the material 1 after being passed through the exhaust gas introducing passage 7 extending from the upper part of the refining furnace 9 to the feeding passage 4 described above.

During the refining, the amount of the slag-forming agent to be added and the amount of oxygen to be blown should be always controlled by determining the composition and measuring the temperature always.

4. Controlling step:

In this step, the composition of the molten steel and its temperature are adjusted to the desired ones prior to feeding the refined molten steel to the final step of continuous casting, and then fed continuously to the casting step.

Since the reaction of the individual ingredients in the molten steel is vigorous at the time of refining, the excess or shortage of the components for obtaining high quality steel of the temperature decrease is observed. In the controlling step, first the final adjustment of the composition and temperature is effected to produce molten steel meeting the conditions sufficient for feeding to the subsequent continuous casting step. This step is essential for storing molten steel temporarily, stabilize the amount of molten flow fluctuating according to variations in the operating conditions in the previous step, and functioning as a molten steel reservoir for use in case of emergency. The molten steel which has passed through the melting and refining steps is temporarily stored in the control furnace when, for example, the operation comes to a halt halfways by an accident, or when the operation is stopped for repair of the furnaces. This makes it possible to prevent any adverse effects on the above steps and the subsequent continuous casting step.

In order to perform the above function in the control step, the control furnace 15 is provided with supply pipes 16 and 17 and a heating device 18. By means of the supply pipe 16, elements necessary for the desired control of the composition of molten steel are added. The temperature of the molten steel is controlled by blowing a cooling gas from the supply pipe 16 or by means of the heating device 18. The control furnace 15 is equipped with an inclining device 19 capable of inclining the control furnace 15. This can lead to the control of the amount of molten steel to be supplied to a continuous casting device (not shown), and also to the removal of molten steel from the control furnace at the time of repair of the devices in each stage or at the end of the operation. Small amounts of exhaust gases evolved from the molten steel in this step are discharged out of the apparatus through a gas extracter 20.

5. Transfer

The transfer of the molten steel between the melting step and the refining step and between the refining step and the control step is carried out continuously through troughs 22 and 23 lined with a refractory material. Instead of the troughs, an electromagnetic pump or electromagnetic trough may be used. Some slag still remains in the molten steel that has left the refining furnace. Accordingly, it is preferred to incline the trough 23 between the refining furnace and the control furnace and flow the slag countercurrently with the molten steel thereby to separate the slag. The slag 1b separated is received in a ladle 14.

6. Continuous casting step

Molten steel having optimum requirements for casting as a result of the final temperature and composition conrol in the controlling step is fed into a tundish (not shown) of a continuous casting device from the control furnace 15. Steel materials such as slab, billet, or bloom are produced continuously there.

Specific examples of producing steel from scrap steel and reduced iron by the process of this invention will be given below.

EXAMPLE 1

This Example illustrates the production of regenerated steel corresponding to JIS G SD 30 (concrete bar) from automobile scrap in accordance with the procedure shown in the accompanying drawing. The preheating of the material by the hot exhaust gas from the refining furnace was not performed. The troughs used are of the conventional type, and electromagnetic troughs were not used.

The composition of the chemical constituents of the starting scrap was C. 0.10–0.18%, Si 0.01–0.95%, Mn 0.01–0.50%, P 0.013–0.035%, and S 0.016–0.040%, and the final desired composition of refined molten steel was expected to be C 0.20–0.30%, Si 0.25–0.30%, Mn 0.80–1.00%, P not more than 0.015%, and S not more than 0.030%.

The material was first transferred into conveyor 6 from a material feeding device (not shown) equipped with a hopper, a screen feeder and a weighing machine. The combustion of the impurities in the material and the preheating of the material were performed using combustion gases at about 1200° C. in the preheating device 5. The material was pre-heated to about 450° C., and the material feed speed was 15 tons/hour.

The melting furnace 3 used was horizontal-type iron core-free induction furnace having a capacity of holding 47 tons of molten iron therein and the ability to supply 8500 KW of electric power. Carbon was fed at a rate of 4.7 Kg/min. from lances 8 by the pneumatic transportation of coke powder. This led to the formation of molten iron having a carbon concentration of about 1.5%. This amount of carbon to be added was predetermined from the expected amount of heat loss in the refining furnace to be used in the subsequent refining step. The fluctuation of the carbon concentration at the exit of the melting furnace by this operation was extremely reduced by the stirring of the molten steel in the induction furnace and the proper presetting of the average residence time of the molten steel within the furnace, and could be set within ± 10% of the desired value. The outlet temperature of the molten steel was 1550° C. This outlet temperature fluctuated within 1550° C ± 10° C.

In the refining step, a refining furnace of the one-stage trough type was used. The amount of the molten steel that could stay in the refining furnace was 4 tons. Oxygen was blown at a rate of 210 Nm³/hour from two lances 11, and at a rate of 14 Nm³/hour from slag-forming agent supply pipe 10. The slag-forming agent was a 4:1 mixture of CaO and CaF$_2$, and was supplied at a rate of 240 Kg/hour. The installing conditions for the lances and the supply pipe were as follows:

| | |
|---|---|
| Nozzle diameter of the lance 11 | 5 mm Φ |
| Distance between the lances | 800 mm |
| Distance between the lances and the molten iron surface | 200 mm |
| Nozzle diameter of the supply pipe 10 | 14 mm Φ |
| Distance between the supply pipe and the molten iron surface | 600 mm |
| Position of installation of the supply pipe 10 | center position between the two lances |

The results obtained under the above operation conditions are shown in Table 1, and the thermal balance based on the operating results is shown in Table 2.

In the refining step, both the temperature of the molten steel and its composition were in the steady state.

Table 1

| Temperature (° C.) | Molten iron before refining 1550 | Molten iron after refining 1580 |
|---|---|---|
| Chemical constituents (%) | | |
| C | 1.5 | 0.25 |
| Si | 0.04 | — |
| Mn | 0.20 | 0.10 |
| P | 0.030 | 0.005 |
| S | 0.020 | 0.010 |
| Efficiency of elimination of carbon dioxide | | 82.2% |

Table 2

| | | | | |
|---|---|---|---|---|
| Incoming heat | Heat of reaction | 850,806 | (Kcal/h) | 13.0% |
| | Heat of slag formation | 61,575 | | 0.9 |
| | Developed heat of metal | 4,836,000 | | 74.0 |
| | Latent heat of CO | 792,600 | | 12.1 |
| | TOTAL | 6,540,981 | | 100.0 |
| Outgoing heat | Sensible heat of exhaust gases | 221,674 | | 3.4 |
| | Sensible heat of slag | 26,070 | | 2.7 |
| | Sensible heat of metal | 4,859,606 | | 74.3 |
| | Latent heat of CO | 792,600 | | 12.1 |
| | Heat loss | 491,783 | | 7.5 |
| | TOTAL | 6,540,981 | | 100.0 |

EXAMPLE 2

This Example illustrates the production of steel corresponding to JIS G SD 30 (concrete bar) from reduced iron in accordance with the procedure shown in the accompanying drawing.

The material used was Wiberg sponge iron having the following composition: total Fe 85–90%, metallic Fe 75–80%, P not more than 0.03%, S not more than 0.03%, and C 0.8–1.0%. The final desired composition of the refined molten steel was the same as that in Example 1.

The material was transported to the conveyor 6 from material feeding device (not shown) equipped with a hopper, a screen feeder and a weighing device, and in order to prevent the re-oxidation of the iron by preheating, 0.1 to 5% of coke powder was mixed with the material. The preheating of the material was carried out using combustion gas at about 1200° C. in the preheating device. The material was pre-heated to about 450° C., and fed at a rate of 18 tons/hour. The melting furnace 3 used was a horizontal type iron core-free induction furnace having a capacity of holding 47 tons of molten steel therein and the ability of supplying 8500 KW of electric power. The addition of carbon was effected by supplying coke powder at a rate of 2.1 Kg/min. from lances 8 by air transportation. This led to the formation of molten steel having a carbon content of about 1.5%. The fluctuations of the concentration and temperature of the molten iron at the outlet of the melting furnace were the same as in Example 1. The results obtained in the refining and subsequent steps were also the same as those of Example 1.

What is claimed is:

1. A process for regenerating or producing steel from mild steel scraps or reduced iron, which comprises, in combination, the steps of:
   1. charging said steel scrap or reduced iron into a horizontal-type core-free induction furnace and melting said steel scrap or reduced iron therein,
   2. adding carbon to the resulting molten steel melt so that the carbon content of the melt in said induction furnace is adjusted to 0.6 to 3.0%,
   3. adding a slag-forming agent to the melt and blowing more than the stoichiometric amount, based on the above amount of carbon, of oxygen to refine the melt, and
   4. adjusting the composition of the molten steel so refined, so as to obtain a steel having the composition as follows:
   C : 0.07 − 0.25%
   Si : 0.01 − 0.55%
   Mn : 0.01 − 0.80%
   P : 0.04% or less
   S : 0.04% or less
   Fe : remainder.

2. The process of claim 1 which further comprises casting the refined molten steel of step (4) wherein the temperature of the refined melt at the inlet of the casting machine is adjusted to a point 20° to 50° C. higher than the solidifying temperature of the melt, and the casting of the steel is carried out continuously.

3. The process of claim 2 wherein all the steps are carried out continuously.

4. The process of claim 1 wherein mild steel scrap or reduced iron is added continuously to the melt in the furnace, and is melt while it is being immersed in the melted.

5. The process of claim 4 wherein carbon is added to the melt in the furnace together with steel scrap or reduced iron concurrently and continuously.

6. A process for continuously regenerating or producing steel from mild steel scraps, which comprises, in combination, the steps of:
   1. continuously charging said steel scrap or reduced iron into an induction furnace and melting the steel scrap therein,
   2. continuously adding preheated carbon to the resulting melt so that the carbon content of the melt is adjusted to 0.6 − 3.0%,
   3. continuously adding a slag-forming agent to the melt and blowing more than the stoichiometric amount, based on the above amount of carbon, of oxygen to refine the melt, and
   4. adjusting the composition of the molten steel so refined, so as to obtain a steel having the composition as follows:
   C : 0.07 − 0.25%
   Si : 0.01 − 0.55%
   Mn : 0.01 − 0.80%
   P : 0.04% or less
   S : 0.04% or less
   Fe : remainder.

7. The process of claim 6 wherein the melt which is obtained by the steps (1) and (2) and of which carbon content has been adjusted is introduced to another furnace so as to thereby carry out the step (3).

8. The process of claim 6 which further comprises continuously casting the refined molten steel of step (4) wherein the temperature of the refined melt at the inlet of the casting machine is adjusted to a point 20° − 50° C higher than the solidifying temperature of the melt.

* * * * *